United States Patent [19]

Takaragi et al.

[11] Patent Number: 5,309,516
[45] Date of Patent: May 3, 1994

[54] GROUP CIPHER COMMUNICATION METHOD AND GROUP CIPHER COMMUNICATION SYSTEM

[75] Inventors: Kazuo Takaragi, Ebina; Seiichi Susaki, Yokohama; Hiroshi Matsumoto, Sagamihara; Tsutomu Nakamura, Takarazuka, all of Japan

[73] Assignees: Hitachi, Ltd., Tokyo; Hitachi Chubu Software Ltd., Nagoya, both of Japan

[21] Appl. No.: 76,862

[22] Filed: Jun. 15, 1993

Related U.S. Application Data

[63] Continuation-in-part of Ser. No. 35,956, Mar. 23, 1993, which is a continuation-in-part of Ser. No. 802,724, Dec. 5, 1991, Pat. No. 5,218,638.

[30] Foreign Application Priority Data

Dec. 7, 1990 [JP] Japan .................................. 02-400806
Jun. 15, 1992 [JP] Japan .................................. 4-154733

[51] Int. Cl.$^5$ .............................................. H04L 9/00
[52] U.S. Cl. ........................................ 380/45; 380/23; 380/25
[58] Field of Search ....................... 380/21, 23, 25, 45, 380/47

[56] References Cited

U.S. PATENT DOCUMENTS

| | | | |
|---|---|---|---|
| 4,531,020 | 7/1985 | Wechselberger et al. | 380/21 |
| 4,531,021 | 7/1985 | Bluestein et al. | 380/21 |
| 4,578,530 | 5/1986 | Zeidler | 380/25 |
| 4,650,975 | 3/1987 | Kitchener | 380/23 |
| 4,731,840 | 3/1988 | Mniszewski et al. | 380/21 |
| 4,982,429 | 1/1991 | Takaragi et al. | 380/50 |
| 5,016,276 | 5/1991 | Matumoto et al. | 380/45 |
| 5,081,677 | 1/1992 | Green et al. | 380/21 |
| 5,117,458 | 5/1992 | Takaragi et al. | 380/23 |
| 5,218,638 | 6/1993 | Matsumoto et al. | 380/23 |

FOREIGN PATENT DOCUMENTS 63280530 8/1991 Japan .

OTHER PUBLICATIONS

"Security by Card" Takaragi et al. (Aug. 19, 1991) Japan Symposium of Safety & Reliability for communication Network in IEI Com. Eng. pp. 11–20.
"Cryptograhic Method & Application" Institute of Inf. Process. Soc. Japan (Jun. 1991) pp. 714–723.

*Primary Examiner*—Salvatore Cangialosi
*Attorney, Agent, or Firm*—Antonelli, Terry, Stout & Kraus

[57] ABSTRACT

Method and system which permit, among a plurality of terminals, group cipher communication from a desired terminal to a number of desired terminals while ensuring safety of security. A plurality of secret values called master keys which are common to a predetermined subset of IC cards are stored in an IC card. A terminal initially starting communication generates a destination indicator to transmit it to other terminals, selects one of a plurality of master keys stored in an IC card on the basis of the destination indicator, generates a group key by using the selected master key, and performs encipherment and decipherment of a communication message by using the generated group key to carry out broadcast. A terminal standing for a destination receives the destination indicator, selects one of a plurality of master keys on the basis of the destination indicator, generates the group key on the basis of the selected master key and performs encipherment and decipherment of the communication message by using the generated group key.

17 Claims, 9 Drawing Sheets

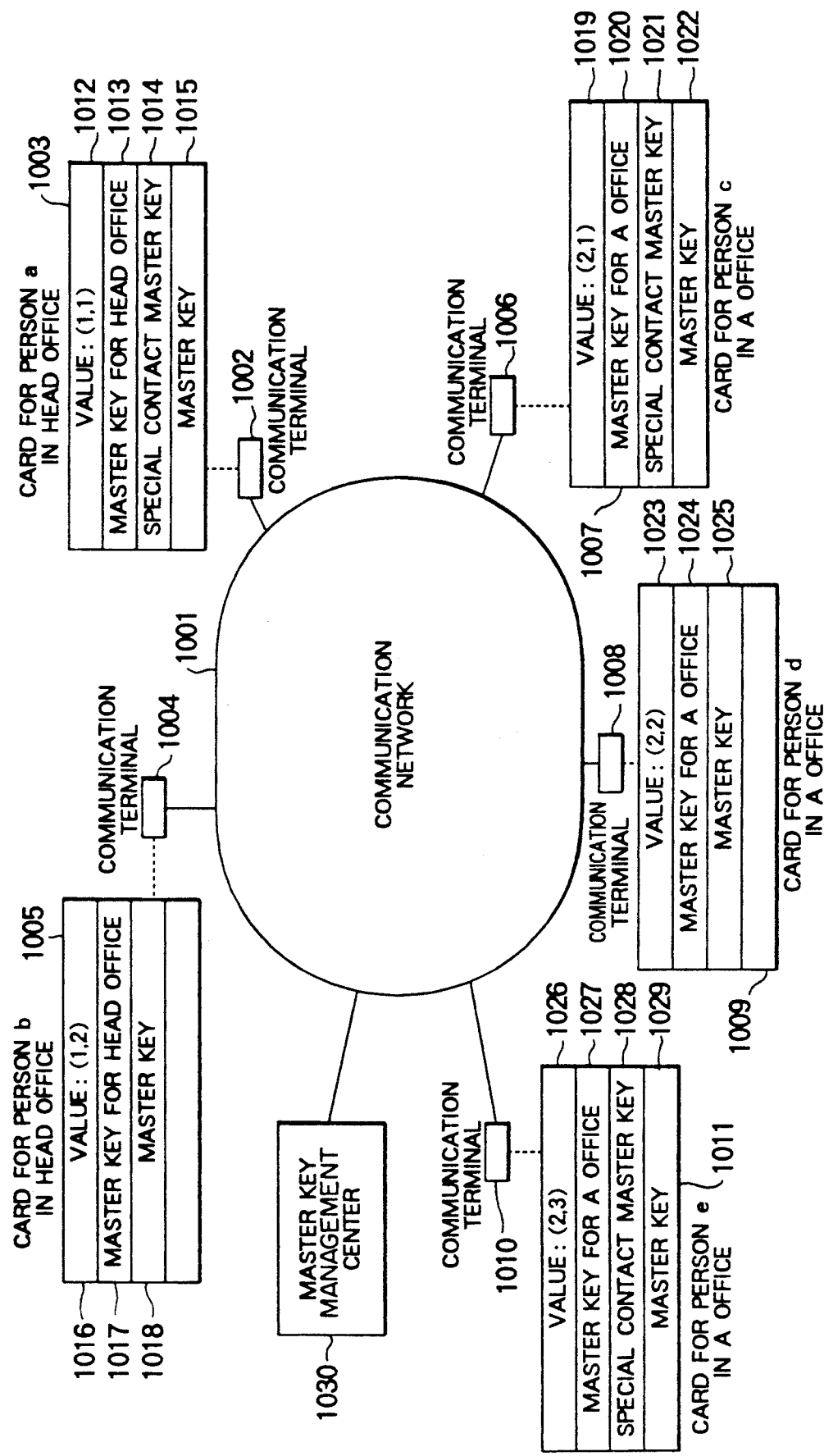

GROUP CIPHER COMMUNICATION METHOD AND GROUP CIPHER COMMUNICATION SYSTEM

CROSS-REFERENCE TO RELATED APPLICATION

This is a continuation-in-part of U.S. Ser. No. 08/035,956, filed on Mar. 23 1993, which is a continuation of U.S. Ser. No. 07/802,724, filed on Dec. 5, 1991, being issued as U.S. Pat. No. 5,218,638. The disclosure of these applications are incorporated by reference herein.

BACKGROUND OF THE INVENTION

The present invention relates to communication method and system for enciphering a communication message and transmitting and receiving the enciphered communication message.

In recent years, advance in technologies of information processing and communication has succeeded in exchanging various kinds of information at high speeds and at low costs by using a communication network. By using a communication satellite (CS) or a local area network (LAN), a piece of information transmitted can be received simultaneously by a great number of terminals. In other words, broadcast can be realized easily to advantage.

However, when broadcast is effected by using the CS or the LAN, a transmitted electric signal or electric wave signal can be received by any of the terminals and therefore, with the broadcast left intact, limited communication cannot be effected wherein information desired to be secret is transferred to a limited partner only.

Approaches to transferring information to only a limited partner and keeping the information secret from the other partners in the broadcast using the CS or LAN are disclosed in the aforementioned U.S. Ser. No. 08/035,956 by the present inventiors. Of them, one method is announced in, for example, "Security by Card" by Takaragi, Fukuzawa and Nakamura, at the symposium of safety and reliability for communication network in information society in the Institute of Electronics, Information and Communication Engineers, Japan, Aug. 19, 1991, pp. 11-20.

The method disclosed in the above literature will be described with reference to FIG. 9.

FIG. 9 shows a work station (WS) 902 and an IC card 901 on the receiving side in a communication system.

Firstly, WS 902 receives a destination indicator through a communication network 917. The destination indicator includes data as below.

| Destination indicator = | office number 1 \|\| distribution list 1 \|\| random value 1 \|\| key information 1 \|\| office number 2 \|\| distribution list 2 \|\| random value 2 \|\| key information 2 \|\| . . . |
|---|---| where symbol \|\| represents data connection.

After that, on the basis of a value "2" of office identification number 925 and a value "3" of person identification number 926 which have been read out of a memory 903 of the IC card in advance, the WS 902 checks whether this WS is included in objects of destination. For example, it is assumed that the office number 1 assumes a value "2" and the distribution list 1 is a bit sequence of "00 . . . 0101" in the above destination indicator. In this example, the office identification number 925 stored in a memory 914 of the WS 902 assumes a value "2", thus being coincident with the office number 1 in the aforementioned destination indicator. In addition, the person identification number 926 stored in the memory 914 of the WS 902 assumes a value "3" and therefore the third bit, from the lowest, pointed out by this value "3" is referred to in the distribution list 1, thus being found to be "1". Accordingly, it is determined that the office identification number 925 (value "2") and the person identification number 926 (value "3") are contained in the destination indicator.

Subsequently, the WS 102 transmits the destination indicator of "office number 1 \|\| distribution list 1 \|\| random value 1 \|\| key information 1" in question to the IC card 901. Then, in the IC card 901, a similar check is also carried out by using office identification number 918 (value "2") and person identification number 919 (value "3"). Since in this example "coincidence" results through the check, the following calculation is carried out by using a master key for single office 920:

| Work key ← | H (master key for single office, office number 1 \|\| distribution list 1 \|\| random value 1) |
|---|---|
| Group key ← | D (work key, key information 1) | where H (I, M) is an output (hash total) of a hash function H having an initial value of I and an input data of M, and D (K, M) is an output of a decipher function D having a key of K and an input data of M.

The IC card 901 transfers the thus calculated group key to the WS 902. Then, the WS 902 uses this group key (stored in a storage area 927 for group key of the memory 914) to decipher a cipher message transmitted from the communication network 917.

In this manner, the WS 902 in which the IC card 901 is inserted can determine that this WS is in the destination indicator, can generate the key and can decipher the cipher message.

Similarly, even in another WS, if an IC card having the office identification number and the person number included in the destination indicator is inserted in this WS, the processing for generation of the group key can be carried out and as a result the WS is ready to decipher the cipher message from the communication network 917.

Through this, cipher communication from a single originator to a number of receivers can be effected in one to multitude relationship.

Incidentally, in the aforementioned example, one of majority parties in the one to multitude communication cannot be a transmitter. In other words, an IC card and a WS on the receiving side cannot prepare the aforementioned destination indicator. This is because the IC on the receiving side has only one master key for single office which is available for only an office to which this IC card belongs.

SUMMARY OF THE INVENTION

An object of the present invention is to provide communication method and system which permit group cipher communication from one desired terminal to a multitude of desired terminals throughout a plurality of terminals while maintaining safety of security.

To accomplish the above object, according to one feature of the invention, in group cipher communication method and system applied to a communication system including a plurality of IC cards, a plurality of communication terminals each having an input/output interface to an IC card, and a communication network interconnecting the communication terminals, the IC cards are each stored with a value different for individual IC cards to specify them and with a plurality of secret values called master keys which are common to a predetermined subset of the IC cards; a terminal initially starting communication generates a destination indicator for specifying a partner to be communicated with to transmit the destination indicator to other terminals, selects one of the plurality of master keys stored in an IC card inserted in the communication starting terminal standing for an originator on the basis of the destination indicator pursuant to a rule prescribing, for example, priority, generates a group key by using the selected master key, and performs encipherment and decipherment of a communication message by using the generated group key to exchange the communication message; and a terminal standing for a destination receives the destination indicator, selects one of the plurality of master keys stored in an IC card inserted in the destination terminal on the basis of the destination indicator, generates the group key by using the selected master key, and performs encipherment and decipherment of the communication message by using the generated group key to exchange the communication message.

Preferably, the value different for the individual IC cards may be used as a pointer for check position designation adapted to check a specified position in a data sequence called the destination indicator to be inputted to an IC card. It can be determined through this check whether a terminal in which that IC card is inserted is a destination. If being a destination, this destination terminal selects one of the plurality of master keys from the destination indicator. Preferably, the master keys may be prevented from being read anytime except when this terminal is authentically accessed by a terminal in the communication system.

The group key may preferably be obtained through calculation based on a hash function having, as input, data including the master key which is a selected secret value and the destination indicator, in accordance with, for example, the method disclosed in the aforementioned application.

Further, a key distribution center may be adapted to keep in the IC card a cipher function and a secret value called a personal key which is not delivered out of an IC card and is different for individual IC cards, performs calculation of encipherment of data called a master key ciphertext inputted to the IC card by using the personal key and the cipher function, and updates an area of the IC card on which the master key is written by using a result of the calculation to renew the master key.

To outline the operation of the above form of the present invention, a terminal starting communication (transmission) generates a destination indicator specifying a partner to be communicated with and transmits the destination indicator to another terminal. Also, on the basis of the destination indicator, the originator terminal selects one of the plurality of master keys stored in an IC card inserted in this terminal, generates a group key by using the selected master key, and performs encipherment and decipherment of a communication message by using the generated group key to exchange the communication message. On the other hand, a destination terminal receives the destination indicator, selects one of the plurality of master keys stored in an IC card inserted in this terminal on the basis of the destination indicator, generates the group key by using the selected master key, and performs encipherment and decipherment of the communication message by using the generated group key to exchange the communication message. Thus, the group key is generated in individual terminals on the receiving side by using the same master key. Accordingly, by designating a plurality of desired communication partners over a plurality of offices, a group key necessary for performing group cipher communication can be possessed in common to the plurality of communication partners.

If the contents of an IC card belonging to other office than offices under communication should leak, security of communication between the offices under communication would not be affected because the specific master key is used between these offices. When a key is desired to be possessed in common to a plurality of offices, if a proper group master key is not provided in an IC card, a master key may be used. In this case, unless the contents of all of the IC cards stays leaked, security of communication can be secured.

When a scheme for renewing the masters key by inputting a master key ciphertext enciphered using the aforementioned personal key is used, in the event that the master keys need to be renewed under the circumstances of, for example, master key leakage, the key distribution center can renew the master keys by relatively safe means such as cipher communication with each terminal after telephone confirmation.

Further, in a scheme for renewing the master keys by inputting a master key division ciphertext enciphered using a plurality of personal keys, the master keys in the IC card can be generated by setting the plurality of personal keys on the basis of the individual master key ciphertexts distributed from a plurality of key centers and synthesizing the thus set personal keys. Accordingly, the generated master key cannot be unveiled through single work of key center without conspiracy of the plurality of key centers with each other. Accordingly, privacy between communication parties can be protected even against the key center (FIG. 8).

BRIEF DESCRIPTION OF THE DRAWINGS

in FIG. 1 and an example of numerical value data.

FIG. 10 is a block diagram showing the communication system according to the embodiment of the invention.

DESCRIPTION OF THE PREFERRED EMBODIMENTS

Embodiments of the invention will now be described with reference to the accompanying drawings.

FIG. 10 shows a cryptographic communication system to which group cipher method and apparatus of the present invention are applied. The cryptographic communication system comprises five communication terminals 1002, 1004, 1006, 1008 and 1010 each having an input/output interface to an IC card, and a communication network 1001 which interconnects them. IC cards 1003, 1005, 1007, 1009 and 1011 are inserted in the communication terminals 1002, 1004, 1006, 1008 and 1010, respectively.

Stored in individual IC cards are values 1012, 1016, 1019, 1023 and 1026 which are different for the individual IC cards. In a value (x, y), x represents an office number and y represents a person number assigned in this office. It is now assumed that office number "1" indicates the head office and office number "2" indicates A office. The value 1012 of the IC card 1003 is (1, 1) and therefore this card is dedicated to person a in the head office. Likewise, the IC card 1005 having the value 1016 being (1, 2) is dedicated to person b in the head office, the IC card 1007 having the value 1019 being (2, 1) is dedicated to person c in the A office, the IC card 1009 having the value 1023 being (2, 2) is dedicated to person c in the A office, and the IC card 1011 having the value 1026 being (2, 3) is dedicated to person e in the A office.

Also stored in each IC card ar secret values called master keys which ar prohibited from being read out to the outside. Among them, master keys for the head office 1013 and 1017 are common to the cards 1003 and 1005 dedicated to people a and b in the head office. Master keys for the A office 1020, 1024 and 1027 are are common to the cards 1007, 1009 and 1011 dedicated to people c, d and e in the A office. Master keys 1015, 1018, 1022, 1025 and 1029 are common to all of the five IC card 1003, 1005, 1007, 1009 and 1011. Special contact master keys 1014, 1021 and 1028 are common to limited IC cards only and they are also called group master keys. A master key management center (distribution center) 1030 connected to the communication network 1001 issues and distributes various kinds of master keys in the form of user IC cards for the individual communication terminals. A plurality of key management centers may be provided.

Figure 1:
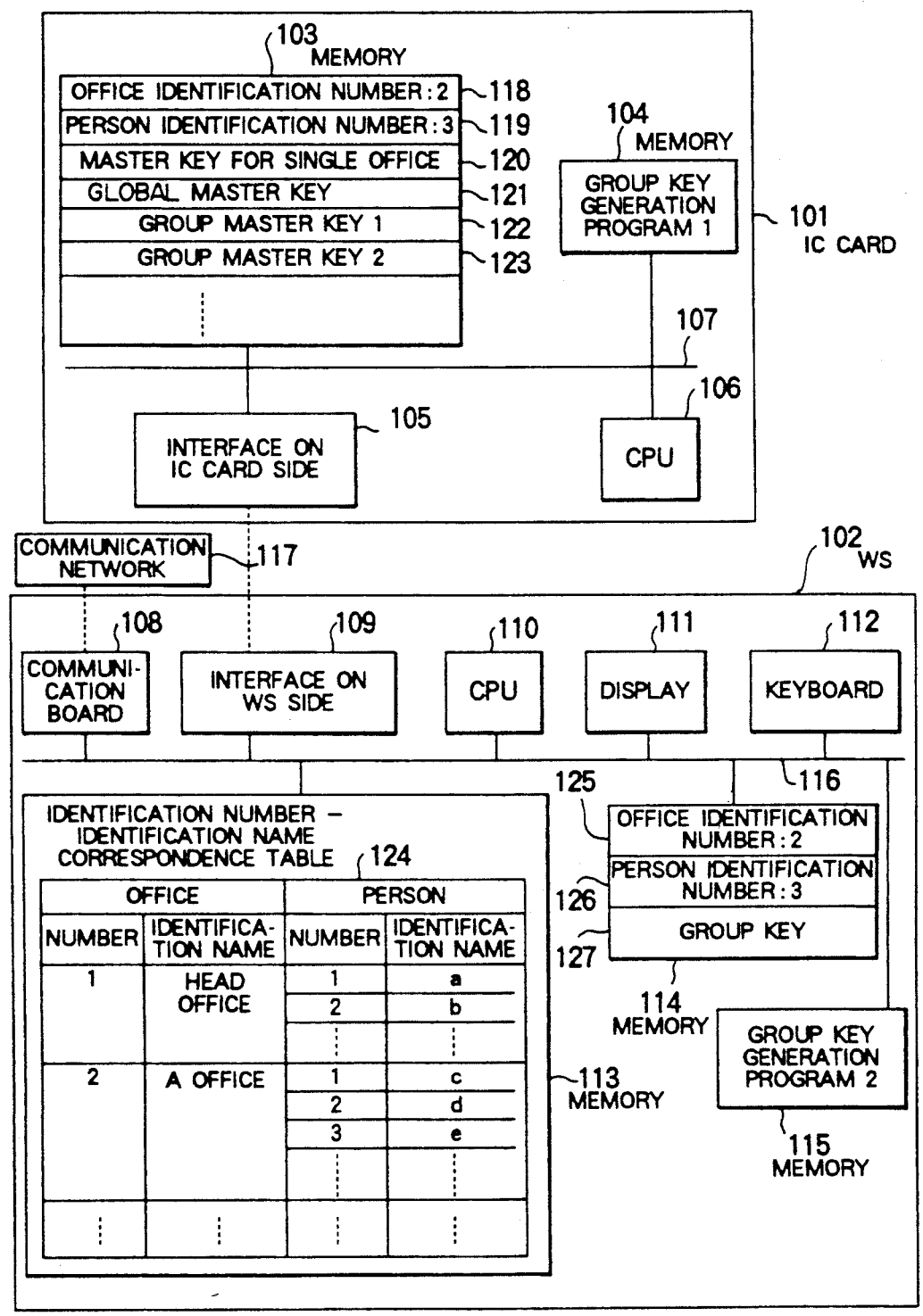
FIG. 1 is a block diagram showing the construction of a terminal in a communication system according to an embodiment of the invention.

Of the cards and communication terminals shown in FIG. 10, the card 1011 for person e in the A office and the communication terminal 1010 associated therewith are detailed in FIG. 1. Referring to FIG. 1, IC card 101 (corresponding to 1011 in FIG. 10) performs transmission and reception of data to and from work station (WS) 102 through an interface 105 on the side of IC card and an interface 109 on the side of WS. The WS 102 performs transmission and reception of data to and from communication network 117 through a communication board 108.

In the IC card 101, a CPU 106 operates in accordance with a group key generation program 1 in a memory 104. In a memory 103, an office identification number 118 (corresponding to the first numeral of value 1026 in FIG. 10) has a value of "2" and a person identification number 119 (corresponding to the second numeral of value 1026 in FIG. 10) has a value of "3", thereby indicating that a possessor of the IC card 101 is a person assigned with number "3" who belongs to an office represented by office number "2" (i.e., A office). More specifically, by looking up an identification number-identification name correspondence table 124 stored in a memory 113 of the WS 102, the possessor of the IC card 101 can be determined to be person e in the A office. A master key for single office 120 (1027 in FIG. 10), a global master key 121 (1029 in FIG. 10), group master keys 122 and 123 (1028 in FIG. 10) and the other are each random data of 64-bit length. As will be described later, a plurality of master keys for single office 120 may be provided in some applications.

In the WS 102, a CPU 110 operates in accordance with a group key generation program 2 in a memory 115. The identification number-identification name correspondence table 124 in the memory 113 indicates that office number "1" represents the head office, person number "1" in the head office represents person a, and person number "2" in the head office represents person b and so on. Likewise, office number "2" represents the A office and in the A office, personal number "1" represents person c, person number "2" represents person d, person number "3" represents person c and so on. A memory 114 has areas 125 and 126 for reading and storing the office identification number 118 and person identification number 119 stored in the memory 103 of the IC card 101 inserted in the WS 102. Here, since the office identification number 118 is "2" and the person identification number 119 is "3" for illustration purpose, the office identification number 125 is "2" and the person identification number 126 is "3". The memory 114 also has an area 127 for storing a result of generation of a group key.

Additionally, the WS 102 comprises a display 111 which provides the operator with input/output means and a keyboard 112.

As described above, each IC card stores an office identification number and a person identification number (generally called a value in FIG. 10) which are specific to a possessor of that IC card. By inserting an IC card in any terminal in the communication network 117, its possessor is placed in a situation which permits the possessor to communicate with other people through the communication network 117.

When any person in the communication network performs cipher communication by desirably designating a plurality of communication partners, the person can have a cipher key in common with the communication partners through a method to be described below.

Figure 2:
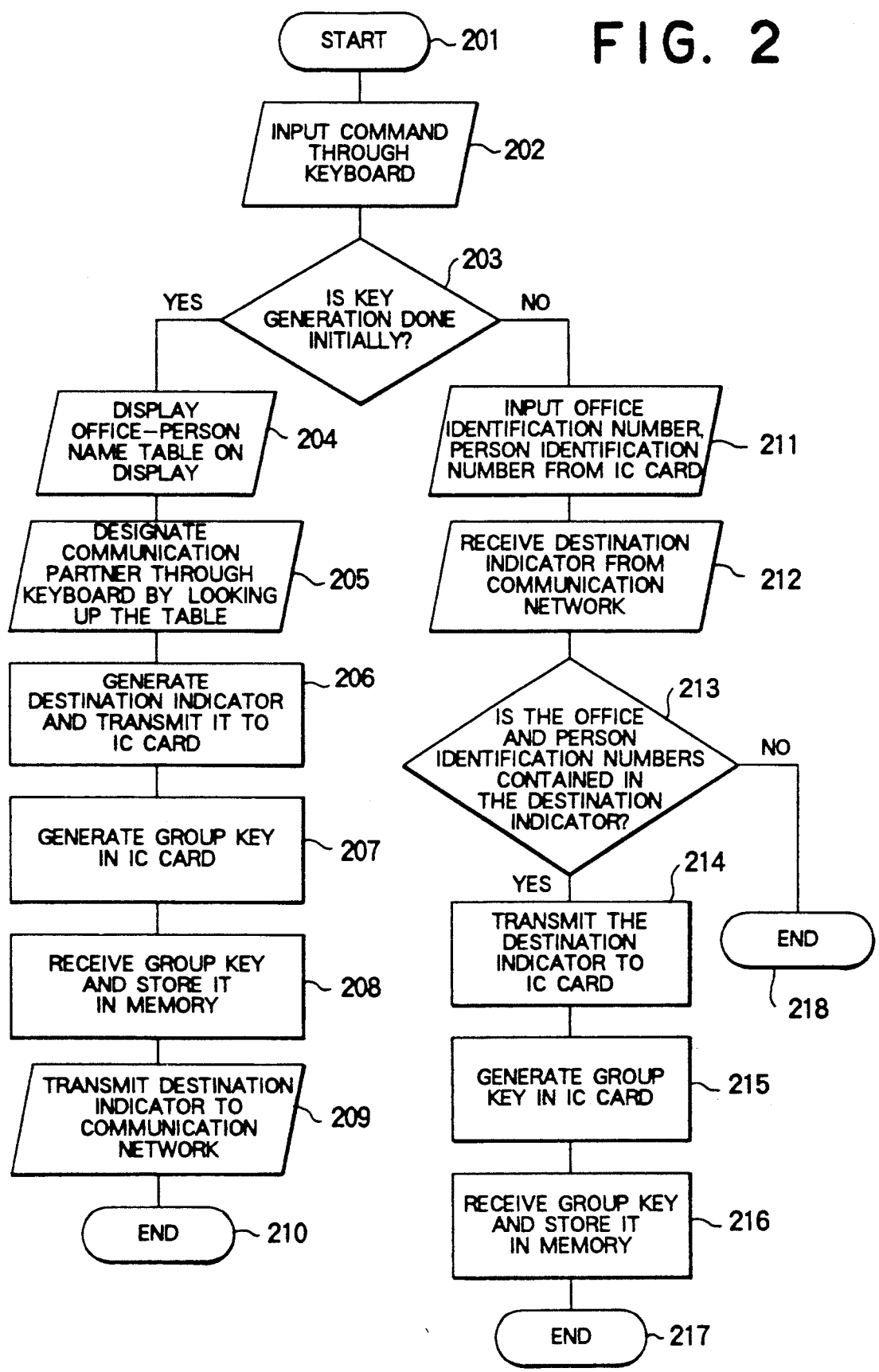
FIG. 2 is a flow chart showing the operation of a group key generation program 2 in FIG. 1.

FIG. 2 is a flow chart useful to explain the operation of the group key generation program 2 stored in the memory 115 of the terminal 102 in which the IC card 101 is inserted. The processing is first started in step 201 and, in step 202, the operator inputs through the keyboard 112 either a command indicating that the operator carries out key generation initially or a command indicating that the operator performs key generation after the other communication partner does. If the former command is adopted, step 203 branches to step 204 but if the latter command is adopted, the step 203 branches to step 211. The initial generation of a key signifies that communication is started initially from this terminal (terminal of interest) to the other terminal at a time point on the communication network, and the key generation is carried out initially as the procedure for this purpose. The key generation after that effected by the other communication partner signifies that the key generation is carried out to receive a message from the other communication partner who has performed key generation initially to start communication.

When performing the initial key generation, the identification number-identification name correspondence table 124 is first read out of the memory 113 and displayed on the display 111, in step 204. After that, in step 205, an operator selects a communication partner or communication partners by watching an indication on the display 111 and inputs offices to which the communication partner and the operator belong and their names through the keyboard 112. It is now assumed that the operator standing for the originator is person e in the A office, and that the person e selects person b in the head office and person c in the A office as communication partners and inputs office identification numbers and person identification numbers in connection with people b and c. The operator also inputs an office identification number and a person identification number which specify that the operator belongs to the A office and the operator's name is e.

Figure 4:
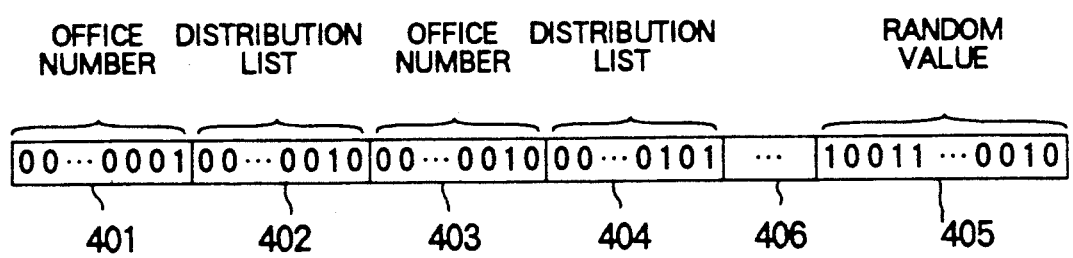
FIG. 4 is a diagram showing a format of a destination indicator inputted to an IC card 101 in FIG. 1 and an example of numerical value data.

Subsequently, in step 206, the CPU 110 of the terminal WS 102 looks up the input information and the identification number-identification name correspondence table 124 to generate a format of destination indicator as shown in FIG. 4. The format of destination indicator includes office numbers, distribution lists and a random value. The office number is of binary numerical data and the distribution list is of bit data in which each bit corresponds to each person in the associated office.

In the format of FIG. 4, office number (office identification number) 401 assumes binary numerical data being "1", indicating that the office number is "1" and the head office is therefore one of destinations. In distribution list 402, the second bit, next to the lowest bit in the bit sequence is "1", thus indicating that the person identification number associated with the head office (office number is "1") is "2", that is, person b is one of destinations. Similarly, office number 403 assumes a value "2", indicating that the A office is one of destinations and in distribution list 404 associated therewith, the person identification number assumes "1" and "3", thus indicating that people c and e are respectively one of destinations. Random value 405 assumes a random number which is updated at the time of execution of the present step 206. The thus generated destination indicator is transmitted to an work area (CPU) of the IC card 101.

Figure 3:
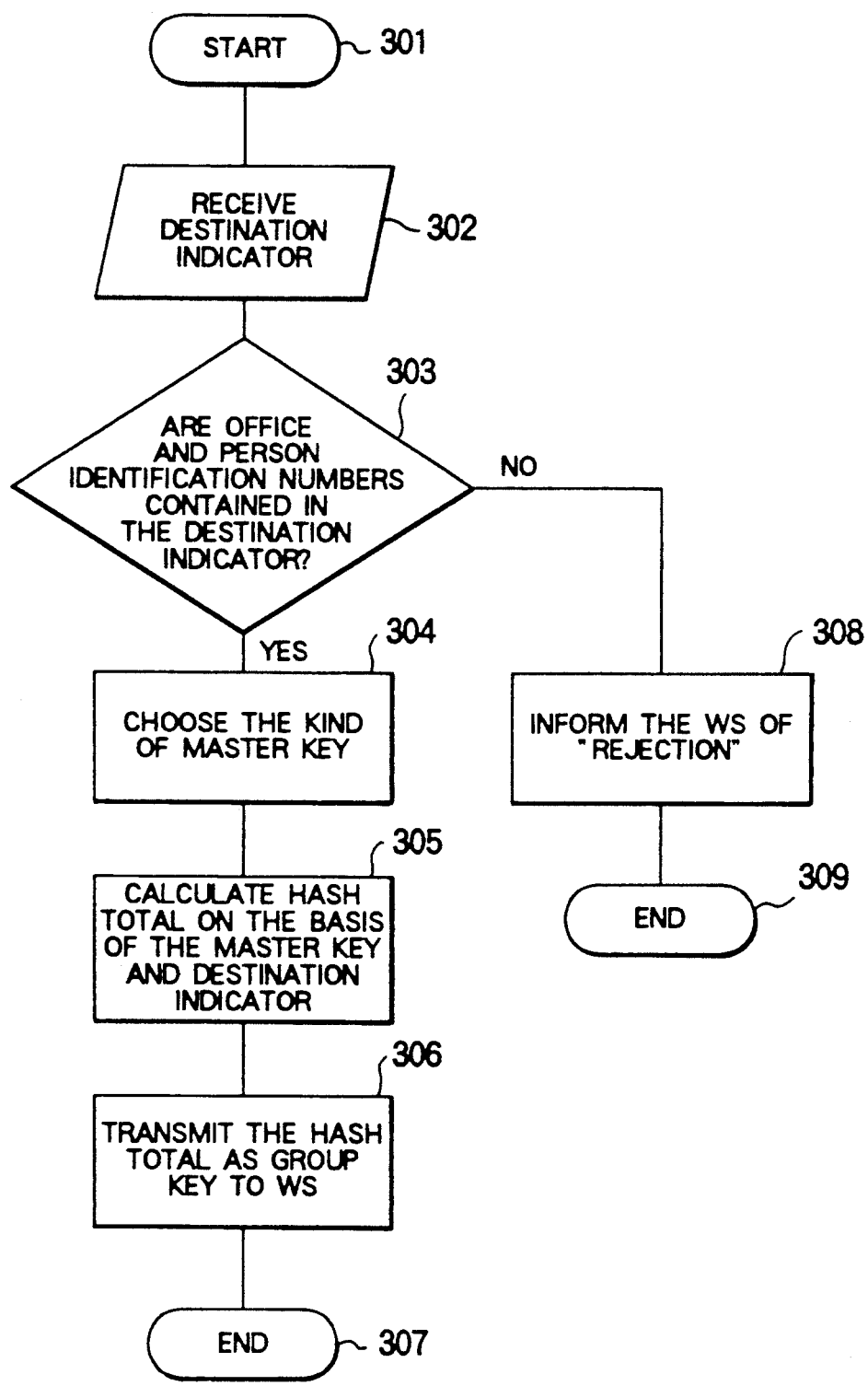
FIG. 3 is a flow chart showing the operation of a group key generation program 1 in FIG. 1.

Subsequently, in step 207, operation as shown in FIG. 3, that is, generation of a group key to be described later is executed in the IC card 101. When the generation of a group key in the IC card 101 ends, the WS 102 receives the group key which is a value returned from the IC card 101 and writes that group key in the storage area 127 for group key of the memory 114. In step 209, the destination indicator formatted as shown in FIG. 4 is transmitted to the communication network 117 through the communication board 108 and in step 210, the processing ends. After that, the terminal standing for the originator uses the thus generated group key to encipher a communication message and broadcasts the enciphered message. A communication message transmitted from a partner or a receiving terminal is deciphered by using the thus generated group key.

If it is determined in step 203 that the terminal of interest need not generate a key initially (this terminal is on the receiving side), data in the IC card 101, that is, office identification number 118 and person identification number 119 are first written in the areas 125 and 126 of the memory 114 included in the WS 102, in step 211 of FIG. 2. Thereafter, in step 212, the WS 102 waits for arrival of a destination indicator from the communication network 117. Upon reception of the destination indicator, the program proceeds to the next step. This example will be described on the assumption that the destination indicator formatted as shown in FIG. 4 is received.

In step 213, it is checked whether the destination indicator contains a destination indicated by the office identification number 125 and person identification number 126 of the memory 114. If the indicated destination is contained, the program proceeds to step 214 but otherwise the program proceeds to step 218 to end the processing.

In step 214, the destination indicator is transmitted to the IC card 101. Then, in step 215, operation shown in FIG. 3, that is, generation of a group key to be described later is carried out in the IC card 101. During this interval of time, the WS 102 is placed in a waiting state. When the generation of a group key in the IC card ends, the WS receives in step 216 the group key which is a value returned from the IC card 101 and write that group key in the storage area 127 for group key of the memory 114. The processing then ends in step 217. Thereafter, the terminal 102 uses the thus generated group key to decipher the received communication message. When transmitting a communication message to a partner, the terminal enciphers the message by using the generated group key and broadcasts the enciphered message.

FIG. 3 is a flow chart for explaining the operation of the group key generation program 1 stored in the memory 104. The processing is first started in step 301 and, in step 302, the destination indicator (FIG. 4) is received through the interface 105 on the side of the IC card. Subsequently, it is checked in step 303 whether an office identification number 118 and a person identification number 119 ar contained simultaneously in the destination indicator. If contained, the program proceeds to step 304. Otherwise, the program proceeds to step 308.

When An IC card now in execution of the processing of FIG. 3 is the IC card 101 (dedicated to person e in the A office) and the received destination indicator assumes the numerical example shown in FIG. 4, the field of office number 403 assumes numerical value "2" and in the succeeding field of distribution list 404, bit "1" is established at the third bit, and therefore office identification number 118 (numerical value "2") and person identification number 119 (numerical value "3") are determined to be contained simultaneously.

Thereafter, in step 304, the kind of a master key to be used is chosen through the procedure shown in FIG. 6 (to be described later). In step 305, a hash total is calculated by using the destination indicator and that master key pursuant to Hash total ←H (master key, destination indicator)
where H (K, M) is a hash function, and a hash function defined in, for example, a literature by Takaragi entitled "Cyptographic Method and Application" in the Institute of Information Processing Society, Japan, June, 1991, pp. 714-723 may be used here. Subsequently, in step 306, the hash total is delivered to the WS 102 through the interface 105 on the IC card side and in step 307, the processing ends. This hash total is used as a group key.

On the other hand, when it is determined in step 303 that office the identification number 118 and person identification number 119 are not contained in the destination indicator simultaneously, a "rejection" notice is delivered, in step 308, to the WS 102 through the interface 105 on the side of the IC card and in step 309, the processing ends.

Figure 5:
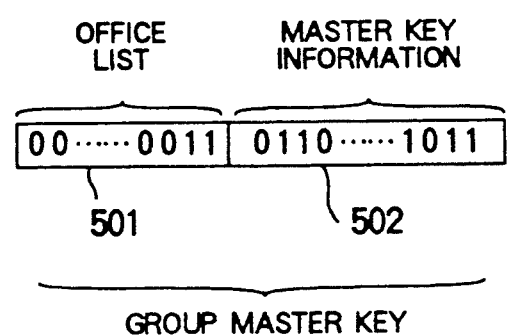
FIG. 5 is a diagram showing a format of group master keys 122, 123, . . .
Figure 6:
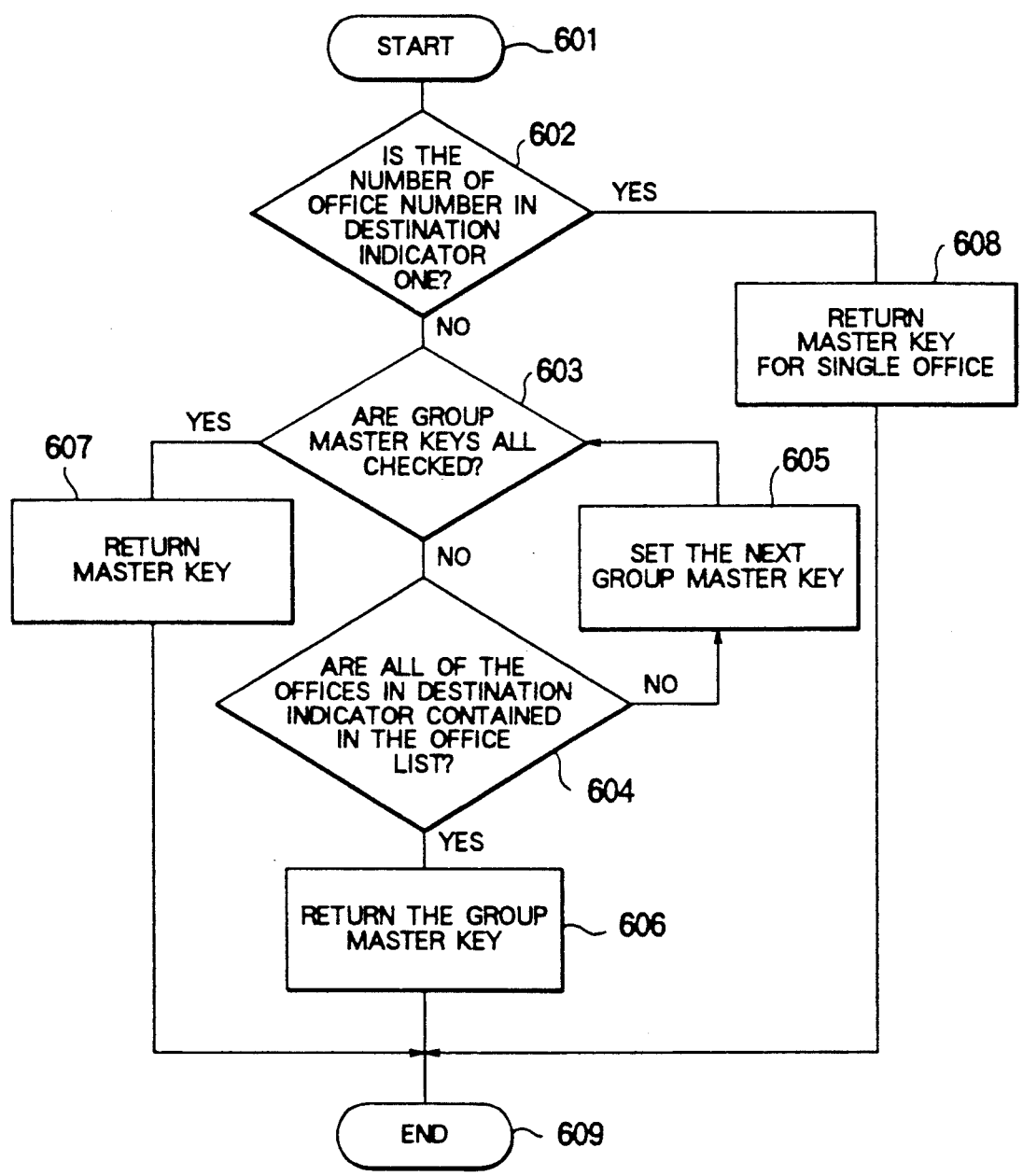
FIG. 6 is a flow chart showing details of operation in step 304 of the processing in FIG. 3.

FIG. 6 is a flow chart for explaining details of the operation of step 304 in the processing of FIG. 3. Firstly, when the processing is started in step 601, it is checked in step 602 whether the number of data indicative of office number in the destination indicator (FIG. 4) is only one. If the number is only one, indicating that communication with only an office indicated by the data is in execution, the program proceeds to step 608 in which master key for single office 120 is returned to the main routine and then the program proceeds to step 609. When it is determined in step 602 that the number of data pieces indicative of office number in the destination indicator (FIG. 4) is larger than one, the program proceeds to step 603. In the example of numerical value in FIG. 4, the number of data in the office number field is two or more Subsequently, it is decided in step 603 whether group master keys 122, 123, . . . are all checked. If all of the group master keys are checked, the program proceeds to step 607. Otherwise the program proceeds to step 604. FIG. 5 shows an example of a format of group master key. The group master key includes an office list 501 and master key information 502 corresponding thereto. The office list 501 is bit data in which bits corresponding to individual offices are aligned. In the example of FIG. 5, the lower bit (the first bit) is "1", the second bit is "1" and the other bits are "0" in the office list 501, thus indicating that this master key information 502 is for a group master key of a group of offices represented by office identification number "1" and "2".

Thereafter, in step 604, it is checked whether the field of office list 501 of the group master key (FIG. 5) contains all of the offices shown in the destination indicator (FIG. 4). If it contains, the program proceeds to step 606. Otherwise, the program proceeds to step 605. In the numerical example of FIG. 5, the office list 501 contains office identification numbers "1" and "2". In the numerical example of FIG. 4, the office number 401 assumes office "1" and the office number 403 assumes office "2". Therefore, if in FIG. 4 the remaining field 406 (indicated by . . . ) is blank, the field of office list (501) of the group master key (FIG. 5) contains all of the offices shown in the destination indicator (FIG. 4).

If it is determined in step 604 that the field of office list 501 of the group master key does not contain all of the offices shown in the destination indicator, the next group master key on the memory 103 is set in step 605. Then, the program returns to step 603.

When it is determined in step 604 that the field of office list 501 of the group master key contains all of the offices shown in the destination indicator, the group master key (one of the group master keys 122, 123, . . . shown in FIG. 1) is transferred to the main routine instep 606. The program then proceeds to step 609.

When all kinds of group master keys are checked in step 603, global master key is transferred 121 is transferred to the main routine in step 607. Then, the program proceeds to step 609. In step 609, the processing ends.

As described above, IC cards belonging to the same office are written with the same value at the master key for single 120. For example, master keys for single office 120 of the IC cards dedicated to person c, person d and person e in the A office assume the same value. The global master key 121 assumes the same value for all of the IC cards regardless of equality of inequality of office. The group master keys 122, 123 . . . assume the same value for IC cards belonging to the offices designated by the office list (501 in FIG. 5). For example, office numbers "1" and "2" exemplified in 501 of FIG. 5 are recorded in advance at the distribution center in the IC cards belonging to the head office and the A office.

As has been described hereinbefore, according to the present embodiment, when an originator selects communication partners by watching the office identification number-identification name table 124 displayed on the display 112 and inputs partner designating information through the keyboard, a group key held in common to the originator and the communication partners can be generated in the IC card 101, and the group key is set in the memory 114 of the WS 102. In other words, by designating a plurality of desired communication partners over a plurality of offices, a group key necessary for performing group cipher communication can be possessed in common to the originator and the plurality of communication partners. In calculating the group key, the master key is used in the calculation formula, Group key←H (master key, destination indicator)

where H is a hash function and this master key differs depending on numerical data of the destination indicator (FIG. 4) inputted to the IC card 101.

For example, in the case of the numerical example described in FIG. 4, if the field 406 (indicated by . . . ) of the format in FIG. 4 is blank, such a group master key as shown in the numerical example of FIG. 5 is used. This group master key provides numerical data which is contained in only the IC cards belonging to office numbers "1" and "2", that is, the head office and the A office. This excludes the present master key from the contents of an IC card belonging to another office and if that contents should leak, it could not affect security of communication between the present office numbers "1" and "2".

When a key is desired to be possessed in common to a plurality of offices, if a proper group master key is not provided in an IC card, a master key is used to generate a group key. Each IC card includes, in addition to a master key, a master key for single office and some group master keys. Accordingly, if the contents of, for example, one IC card should leak, the master key would become unveiled to thereby degrade security. But unless the contents of all of the IC card stays leaked, security of communication between the offices of the group can be high. This is because a group key cannot be generated in other IC card than that of a designated communication partner.

Figure 7:
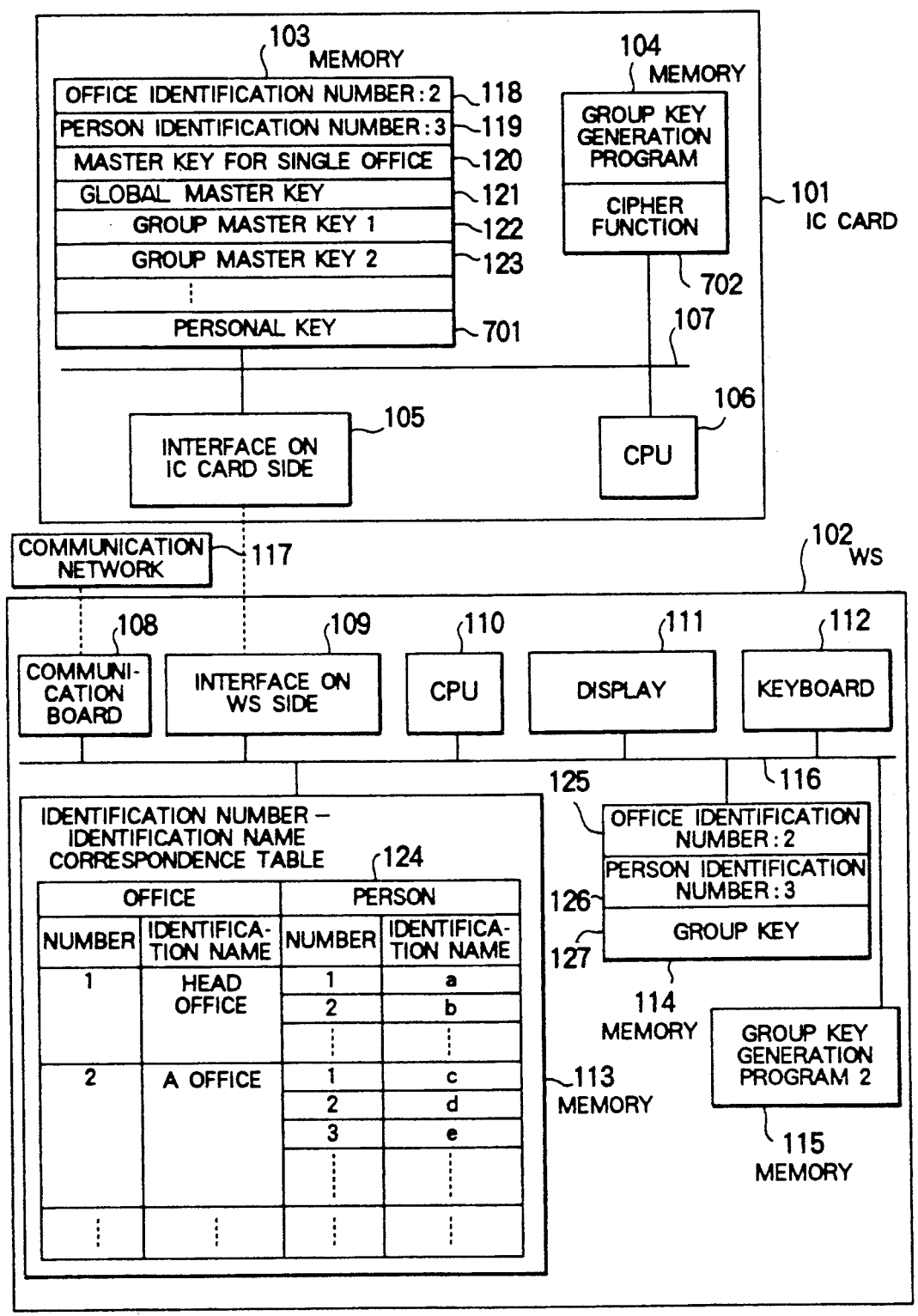
FIG. 7 is a block diagram showing the construction of a system according to a modification 1 of the embodiment.

In the foregoing embodiment the master keys 120, 121, 122, 123, . . . in the IC card 101 are set in advance but in a modification 1 of the foregoing embodiment, a personal key 701 which is different for individual IC cards is set in advance in a memory 103 of an IC card 101 as shown in FIG. 7, whereby master keys 120, 121, 122, 123, ... may be so enciphered as to be different for individual IC cards by using the personal key 701 under the direction of the key center 1030 which performs centralized management of individual personal keys, and resulting master key ciphertexts may be transmitted and deciphered by a cipher function 702 in an IC card and set in a memory 103 on the receiving side.

In accordance with the modification 1, in the event that the master keys need to be renewed under the circumstances of, for example, master key leakage, the master keys can be renewed by relatively safe means such as personal cipher communication which is transmitted to the possessor of the IC card from the key center 1030 after telephone confirmation. When the personal key 701 is renewed, a new personal key is transmitted in one to one relationship between the center and the IC card possessor. For renewal of the master keys 120 to 123, these master keys are broadcast to IC cards of n people by using a data key.

Figure 8:
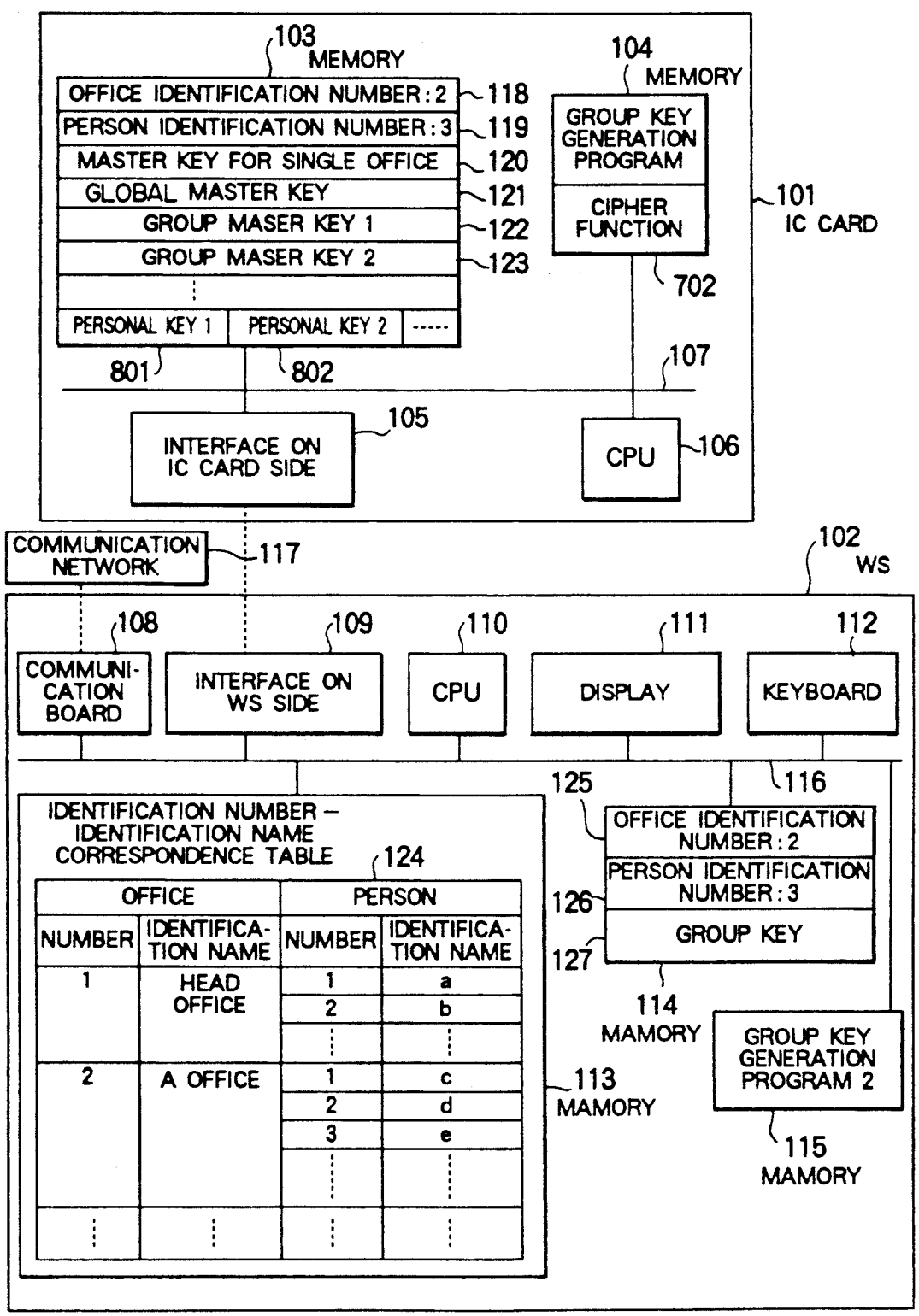
FIG. 8 is a block diagram showing the construction of a system according to a modification 2 of the embodiment.
Figure 9:
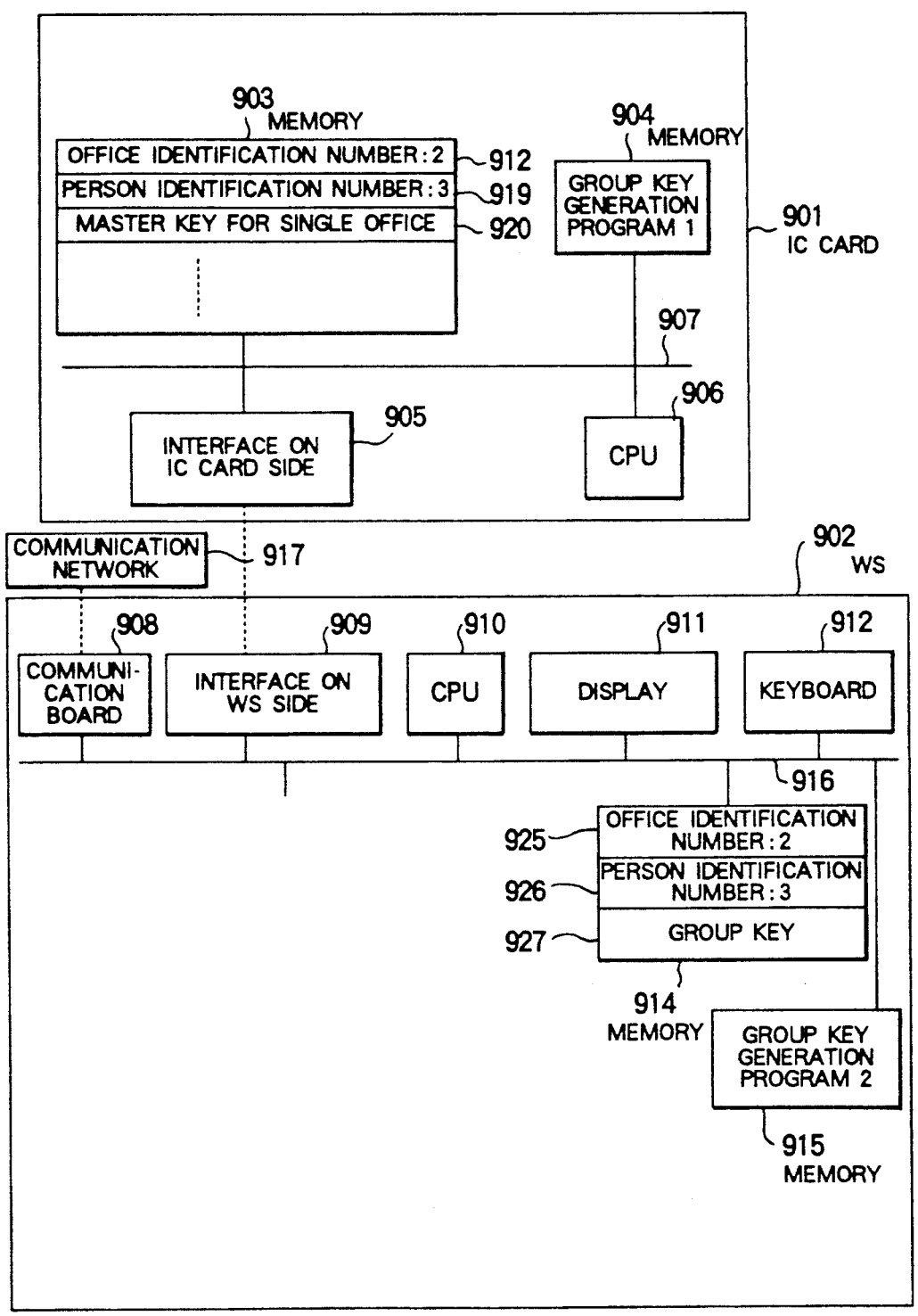
FIG. 9 is a block diagram showing the construction of a background example of system in the invention.

In the foregoing embodiment the master keys 120, 121, 122, 123, ... in the IC card 101 are set in advance but in a modification 2 of the foregoing embodiment, a personal key 801 registered in a first key management center, a personal key 802 registered in a second key management center and a personal key 80n registered in an n-th key management center, which personal keys are different for individual IC cards, are set in advance as shown in FIG. 8. Each center performs centralized management of a corresponding key of IC card. Upon renewal of master keys, the first center enciphers first master key registration information used for generation of master key information by using the personal key 801 and transmits a resulting master key division ciphertext. In an IC card on the receiving side, the master key division ciphertext is deciphered by using a cipher function 702 to obtain the first master key registration information. Similarly, the second center enciphers second master key registration information with the personal key 802 and transmits a resulting ciphertext; and the ciphertext is deciphered with the cipher function 702 in the IC card on the receiving side to obtain the second master key registration information. In the presence of another center, n-th master key registration information is obtained in a similar way. Then, in the IC card 101, a master key may be calculated pursuant to a calculation formula,

---

Master key ← first master key registration information + second master key registration information + ...

--- where "+" represents exclusive OR between individual bits, and the thus obtained master key may be set in a memory 103.

In accordance with the modification 2, the master key is generated through co-work of a plurality of key centers. Accordingly, unless the plurality of key centers conspire with each other, the master key will not be known to any key center.

In the foregoing embodiment, the final field 405 of the destination indicator is of random value as shown in FIG. 4 but in a modification 3 of the foregoing embodiment, the random value may be replaced with time information or sequence number which changes as the time elapses.

As described above, according to the present invention, by designating a plurality of desired communication partners over a plurality of offices, a group key necessary for performing group cipher communication can be possessed in common. Also, if the contents of an IC card belonging to other office than offices under communication should leak, security of communication between the offices under communication would not be affected.

Further, when a key is desired to be possessed in common to a plurality of offices, if a proper group master key is not provided in an IC card, a master key is used to generate a group key. Even in this case, unless the contents of all of the IC cards stays leaked, security can be secured.

With a personal key used, in the event that the master keys need to be renewed under th circumstances of, for example, master key leakage, the master keys can be renewed by relatively safe means such as personal cipher communication after telephone confirmation. Further, by causing a master key to be generated through co-work of a plurality of key centers, the master key cannot be unveiled through single work of key center without conspiracy of the plurality of key centers with each other. Accordingly, privacy between communication parties can be protected against even the key management center.

We claim:

1. A group cipher communication method applied to a communication system comprising a plurality of communication terminals each using an IC card and having an input/output interface to said IC card, and a communication network interconnecting said communication terminals, said IC cards being each stored with a value different for individual IC cards to specify them and with secret values constituting a plurality of master keys which are common to a predetermined subsets of said IC cards, said group cipher communication method comprising the steps of:

in one of said plurality of terminals which starts transmission, generating a destination indicator for specifying a partner to be communicated with to transmit the destination indicator to other terminals through said communication network;

selecting one of said plurality of master keys stored in an IC card inserted in said transmission start terminal on the basis of said destination indicator to generate a group key by using the selected master key and performing encipherment of a transmission message to be transmitted to said destination terminal, using the selected master key to transmit an enciphered message to said communication network; and receiving an enciphered reception message to decipher the enciphered message by using said generated group key; and in a terminal standing for a destination in said plurality of terminals, receiving said destination indicator from said transmission starting terminal;

selecting one of said plurality of master keys stored in an IC card inserted in said destination terminal on the basis of said destination indicator to generate a group key of destination terminal by using the selected master key;

performing decipherment of an enciphered reception message by using the generated group key; and performing encipherment of a transmission message to be transmitted to said transmission start terminal, using said destination terminal group key to transmit the enciphered transmission message to said communication network.

2. A group cipher communication method according to claim 1 wherein said destination indicator includes information for specifying a partner to be communicated with and desirably selected numerical value information, and said group key is generated by using said selected master key and said destination indicator.

3. A group cipher communication method according to claim 2 wherein said group key is generated through calculation using a hash function having as variables said selected master key and said destination indicator.

4. A group cipher communication method according to claim 1 wherein said destination indicator is checked by using a value stored in said IC card to decide whether said destination indicator designates a value specific to said IC card.

5. A group cipher communication method according to claim 1 wherein the processing of selecting one of said plurality of master keys on the basis of said destination indicator and generating a group key by using the selected master key is executed inside said IC card.

6. A group cipher communication method according to claim 1 wherein said IC card further stores a cipher function and a secret value constituting a personal key different for individual IC cards, and the master key of said IC card is renewed by inputting from the outside a master key ciphertext which results from encipherment of said master key by the personal key, deciphering said master key ciphertext by using said personal key and said cipher function, and overwriting a result of the decipherment on a storage area at which said master key to be renewed has been written.

7. A group cipher communication method according to claim 1 wherein said IC card further stores a cipher function and a plurality of secret values constituting at least first and second personal keys which are different for individual IC cards, and the master key of said IC card is renewed by inputting a master key division ciphertext which results from encipherment of said master key by said first personal key and another master key division ciphertext which results from encipherment of said master key by said second personal key from different external centers, deciphering the plurality of master key division ciphertexts inputted to said IC card by using said first and second personal keys and said cipher function, and applying a predetermined operation to results of the decipherment and overwriting an operation result on a storage area at which said master key to be renewed has been written.

8. A limited cipher communication system including a plurality of communication terminals each using an IC card and having an input/output interface to said IC card, and a communication network interconnecting said communication terminals, said IC cards having each a memory stored with a value different for individual IC cards to specify them and with secret values constituting a plurality of master keys which are common to a predetermined subset of said IC cards, said communication system comprising:

in a terminal in which said IC card is inserted,
means for generating and delivering a destination indicator for specifying a partner to be communicated with;

means for selecting one of said plurality of master keys stored in said IC card inserted in this terminal on the basis of said destination indicator generated by this terminal or by that generated by an external terminal;

key generation means for generating a group key by using the selected master key and said destination indicator;

encipherment means for enciphering a transmission message to be transmitted to said partner using the group key generated from said key generation means; and decipherment means for deciphering the enciphered message received from said partner through said communication network using the group key from said key generation means.

9. A limited cipher communication system according to claim 8 wherein said destination indicator includes information for specifying a partner to be communicated with and any selected numerical value information, and said means for generating a group key generates the group key by using said selected master key and said destination indicator.

10. A limited cipher communication system according to claim 9 wherein said means for generating a group key includes calculation means for obtaining the group key by calculating a hash function having as variables said selected master key and said destination indicator.

11. A limited cipher communication system according to claim 8 wherein said destination indicator is checked by using a value stored in said IC card to decide whether said destination indicator designates a value specific to said IC card.

12. A limited cipher communication system according to claim 8 wherein said IC card includes means for selecting one of said plurality of master keys on the basis of said destination indicator, and means for generating a group key by using the selected master key from said selecting means.

13. A limited cipher communication system according to claim 8 wherein said IC card further has memory areas stored with a cipher function and a secret value constituting a personal key different for individual IC cards, and includes means for renewing the master key by inputting from the outside a master key ciphertext which results from encipherment of said master key by the personal key deciphering said master key ciphertext by using said personal key and said cipher function, and overwriting a result of the decipherment on a corresponding area of said memory at which said master key has been written.

14. A limited cipher communication system according to claim 8 wherein said IC card further includes memory areas stored with cipher function and a plurality of secret values constituting at least first and second personal keys which are different for individual IC cards, and includes means for renewing the master key by inputting a master key division ciphertext which results from encipherment of said master key by said first personal key from the outside, inputting another master key division ciphertext which results from encipherment of said master key by said second personal key from the outside, deciphering said plurality of master key division ciphertexts inputted to said IC card by using said first and second personal keys and said cipher function, and applying a predetermined operation to results of the decipherment and overwriting an operation result on a storage area at which said master key has been written.

15. A limited cipher communication system according to claim 8 wherein said communication starting terminal includes interface means for broadcasting, through said communication network, a destination indicator generated by said destination indicator generation means.

16. A limited cipher communication system according to claim 8 wherein each of said terminal includes means for specifying at least one partner to be communicated with, said specifying means including an input unit, a display, a CPU, a memory for storing a table of a value specifying individual IC cards, and a program for displaying a format of destination indicator.

17. In a limited broadcast cipher communication system for use in a communication system comprised of a plurality of communication terminals each using an IC card and having an input/output interface to said IC card, and a communication network interconnecting said communication terminals and in which a terminal starting communication generates a destination indicator for specifying a partner to be communicated with to transmit said destination indicator to other terminals, selects one of a plurality of master keys stored in an IC card inserted in said communication starting terminal on the basis of said destination indicator, generates a group key by using the selected master key, and performs encipherment and decipherment of a communication message by using the generated group key to exchange the communication message; and a terminal standing for a destination receives said destination indicator from said communication starting terminal, selects one of said plurality of master keys stored in an IC card inserted in said destination terminal on the basis of said destination indicator, generates the group key by using the selected master key, and performs encipherment and decipherment of said communication message by using said generated group key to exchange said communication message, said IC card used in said limited broadcast cipher communication system comprising:

a CPU;

an interface for data transfer to and from said terminal;

a first memory having areas for storing a value specifying individual IC cards and secret values constituting a plurality of master keys which are common to a predetermined subset of said IC cards;

a second memory for storing a group key generation program; and group key generation means including said CPU and said second memory, for selecting one master key from said first memory on the basis of said destination indicator and generating a group key by using the selected master key based on said group key generation program.

* * * * *